United States Patent
Chang

(10) Patent No.: US 8,255,020 B2
(45) Date of Patent: Aug. 28, 2012

(54) ROTATABLE CELL PHONE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 246 days.

(21) Appl. No.: 12/846,754

(22) Filed: Jul. 29, 2010

(65) Prior Publication Data

US 2011/0177851 A1 Jul. 21, 2011

(30) Foreign Application Priority Data

Jan. 20, 2010 (CN) .......................... 2010 1 0300468

(51) Int. Cl.
*H04M 1/00* (2006.01)

(52) U.S. Cl. .................................................. 455/575.3

(58) Field of Classification Search .............. 455/550.1, 455/566, 575.1, 575.3; 379/433.13; 16/221, 16/254
See application file for complete search history.

(56) References Cited

U.S. PATENT DOCUMENTS

| 7,751,861 | B2 * | 7/2010 | Mizoguchi et al. | 455/575.3 |
| 7,873,279 | B2 * | 1/2011 | Alameh et al. | 398/114 |
| 7,933,477 | B2 * | 4/2011 | Shigeno et al. | 385/25 |
| 2009/0291721 | A1 * | 11/2009 | Hankui et al. | 455/575.3 |

* cited by examiner

*Primary Examiner* — Nguyen Vo
(74) *Attorney, Agent, or Firm* — Altis Law Group, Inc.

(57) ABSTRACT

A rotatable cell phone includes a display unit, a main unit, a connecting unit, and a signal transmitting unit. The display unit includes a top housing defining a top recess. The main unit includes a bottom housing defining a bottom recess. The connecting unit includes a top assembly module detachably mounted in the top recess, a bottom assembly module detachably mounted in the bottom recess, and a pivot shaft rotatably connecting the top assembly module to the bottom assembly module. The pivot shaft defines an axial hole. The signal transmitting unit is received in the axial hole of the pivot shaft, and is configured for transmitting signals from the main unit to the display unit.

15 Claims, 6 Drawing Sheets

ROTATABLE CELL PHONE

BACKGROUND

1. Technical Field

The present disclosure relates to cell phones and, particularly, to a rotatable cell phone.

2. Description of Related Art

A rotatable cell phone generally includes a display unit and a main unit rotatably connected to the display unit by a pivot shaft. However, the pivot shafts are firmly connected to the display unit and an unskilled person without specialized tools cannot detach the main unit from the display unit without damaging the unit. Thus, when either the display unit or the main unit needs to be replaced, a user cannot replace it by himself, he must take it to a maintenance facility for help.

Thus, what is needed is a rotatable cell phone with a display unit and a main unit which can be easily replaced.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
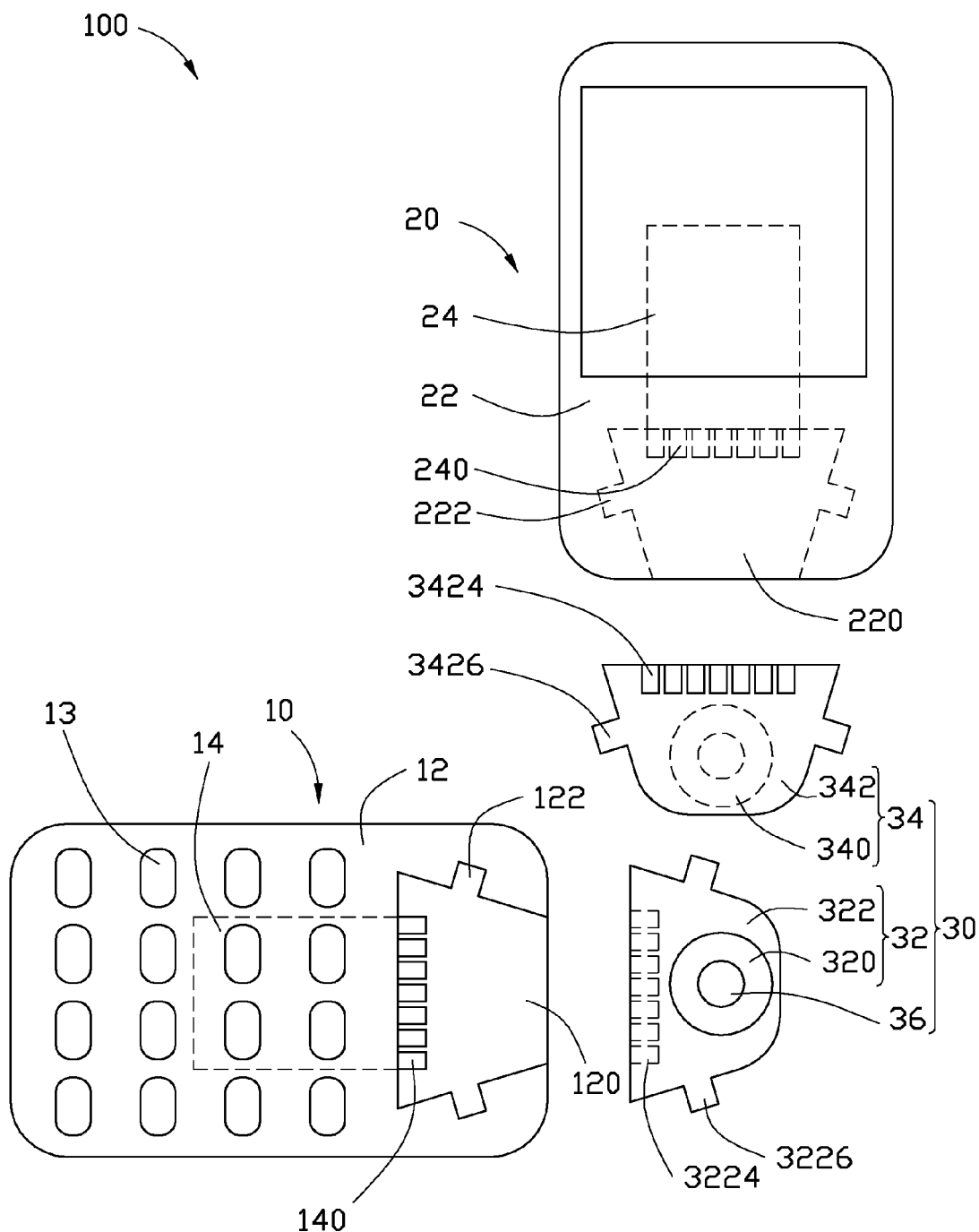
FIG. 1 is a schematic, exploded view of a rotatable cell phone according to a first embodiment.
Figure 2:
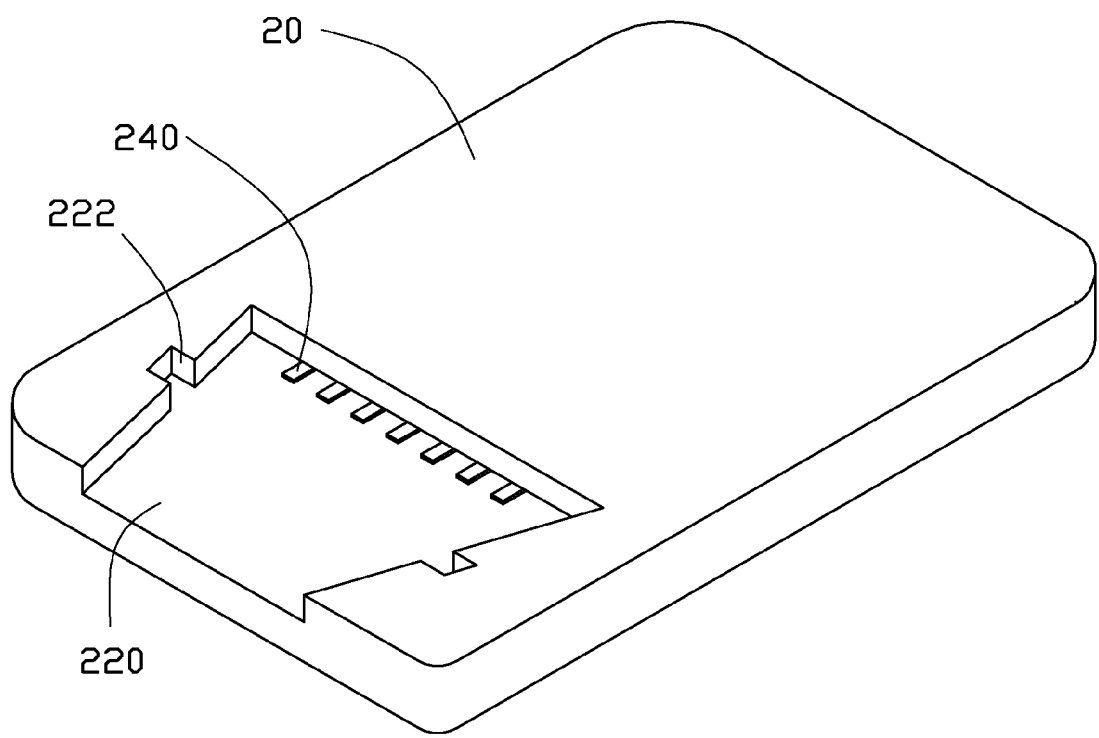
FIG. 2 is an isometric view of a display unit of the rotatable cell phone of FIG. 1.

Referring to FIGS. 1-2, a rotatable cell phone 100 according to a first embodiment is disclosed. The cell phone 100 includes a main unit 10, a display unit 20, a connecting unit 30 and a signal transmitting unit 40 (see FIG. 4). The connecting unit 30 movably connects the main unit 10 and the display unit 20 to each other. The signal transmitting unit 40 connects the main unit 10 to the display unit 20 and transmits signals from the main unit 10 to the display unit 20.

The display unit 20 includes a top housing 22 and a top printed circuit board (PCB) 24 received in the housing 22. The top housing 22 defines a top recess 220 facing the main unit 10. A plurality of top clip holders 222 are defined on corresponding sidewalls of the top recess 220. The top PCB 24 includes a top conductor 240 exposed in the top recess 220. The top conductor 240 is composed of gold fingers and is positioned away from the clip holders 222.

The main unit 10 includes a bottom housing 12 and a bottom PCB 14 received in the bottom housing 12. The bottom housing 12 defines a bottom recess 120 facing the display unit 20. A plurality of bottom clip holders 122 are defined on the corresponding side walls of the bottom recess 120. The bottom PCB 14 includes a bottom conductor 140 exposed in the bottom recess 120. The bottom conductor 140 is composed of gold fingers and is positioned away from the bottom clip holders 122. The main unit 10 further includes a keypad 13 positioned on the surface of the bottom housing 12 facing the display unit 20.

The connecting unit 30 includes a top assembly module 34, a bottom assembly module 32 and a pivot shaft 36. The top assembly module 34 and the bottom assembly module 32 are rotatably connected to each other via the pivot shaft 36.

The top assembly module 34 includes a top turntable 340 and a top attachment piece 342. The top turntable 340 is annular. The top attachment piece 342 is coordinated with the top recess 220 of the display unit 20, and includes a plurality of top clips 3426 corresponding to the clip holders 222. The top attachment piece 342 can be inserted into the top recess 220 and can be fixed on the top housing 22 via the cooperation of the top clips 3426 and the top clip holders 222. The top clips 3426 can be mechanical or magnetic. In the present embodiment, the top clips 3426 are magnetic. The top attachment piece 342 further includes a top sub conductor 3424 for electrically connecting to the top conductor 240.

The bottom assembly module 32 is similar to the top assembly module 34. The bottom assembly module 32 includes a bottom turntable 320 and a bottom attachment piece 322. The bottom attachment piece 322 includes a plurality of bottom clips 3226 and a bottom sub conductor 3224. The bottom attachment piece 322 can be inserted into the bottom recess 120 and can be fixed on the bottom housing 12, thereby the bottom conductor 140 and the bottom sub conductor 3224 are electrically coupled to each other.

Figure 3:
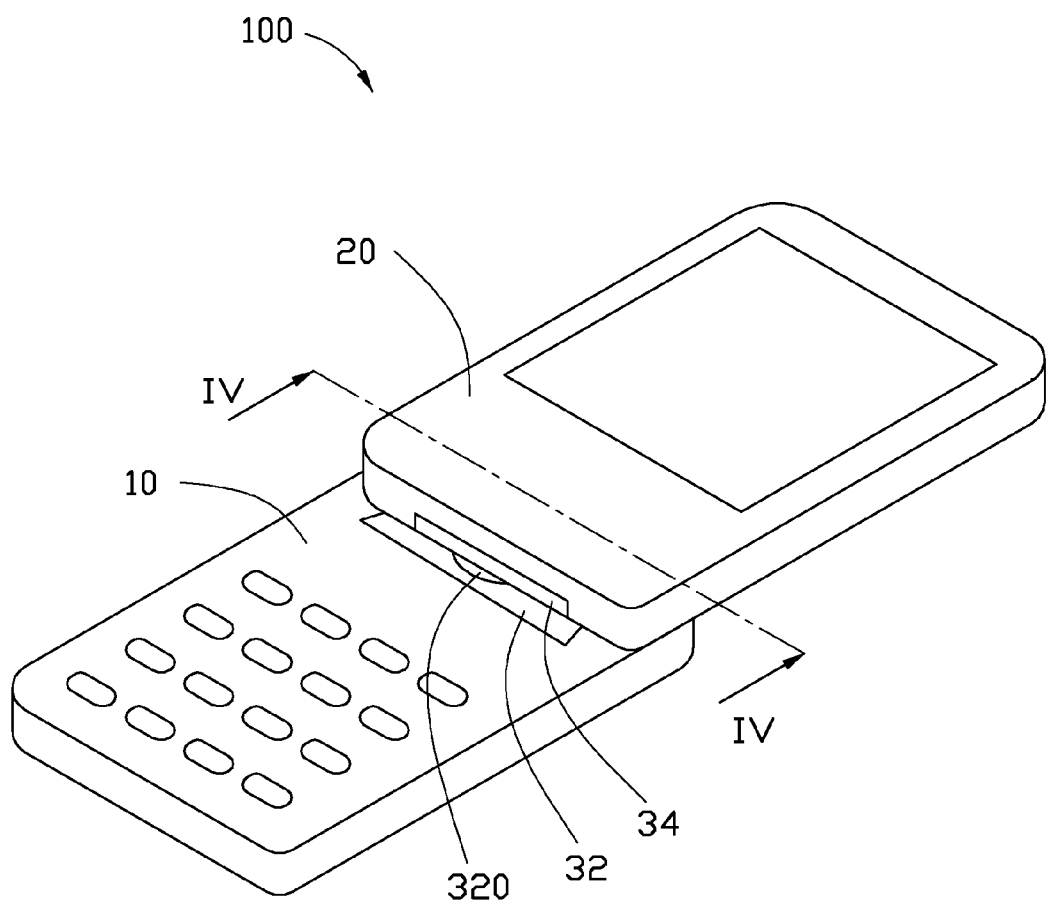
FIG. 3 is an assembled view of the rotatable cell phone of FIG. 1.
Figure 4:
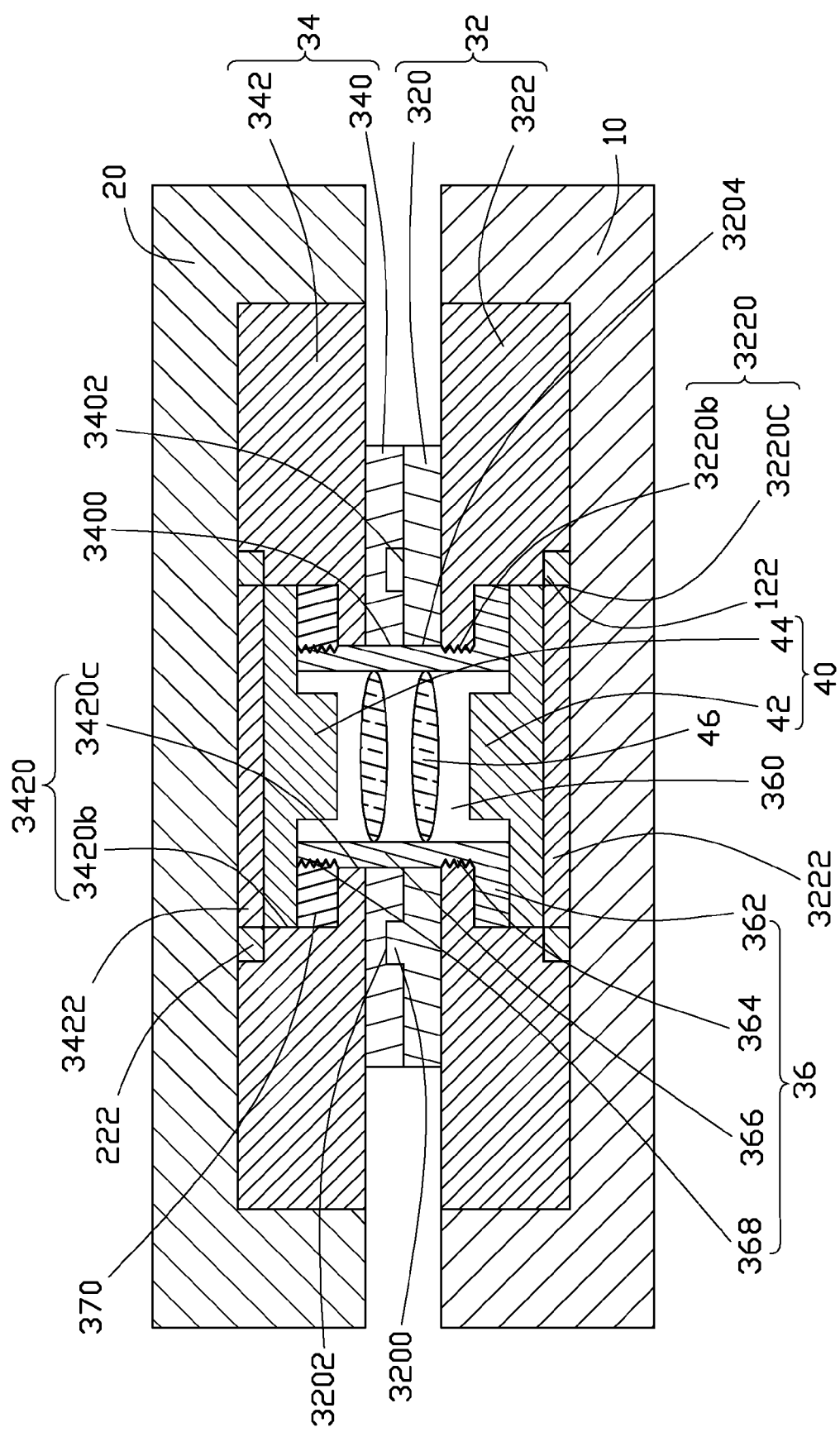
FIG. 4 is a cross-sectional view taken along line IV-IV of FIG. 3.

Referring to FIGS. 3-4, the top attachment piece 342 defines a top through hole 3420 that is stepped. The top through hole 3420 includes a top big hole 3420b and a top small hole 3420c coaxial with the top big hole 3420b. A top sub PCB 3422 is received in the top big hole 3420b and is fixed with the top attachment piece 342. The top sub conductor 3424 is mounted on the top sub PCB 3422.

The bottom attachment piece 322 defines a bottom through hole 3220 that is stepped. The bottom through hole 3220 includes a bottom big hole 3220c and a bottom small hole 3220b coaxial with the bottom big hole 3220c. The bottom small hole 3220b is threaded. A bottom sub PCB 3222 is received in the bottom big hole 3220c and is fixed with the bottom attachment piece 322. The bottom sub conductor 3224 is mounted on the bottom sub PCB 3222.

The top turntable 340 defines a through hole 3400, and the bottom turntable 320 defines a through hole 3204 coaxial with the through hole 3400 and the top and bottom through holes 3420 and 3220. The pivot shaft 36 is a hollow, stepped shaft and defines an axial through hole 360, a glossy end 362, a threaded sub part 364, a glossy sub part 366, and a threaded end 368. The glossy end 362 is bigger than the threaded sub part 364, the glossy sub part 366, and the threaded end 368. The pivot shaft 36 extends through the bottom hole 3220, the through holes 3204 and 3400, and the top hole 3420 in turn, thus to rotatably connect the bottom attachment piece 322, the bottom turntable 320, the top turntable 340, and the top attachment piece 342. The glossy end 362 is positioned in the bottom big hole 3220c and is blocked by the bottom small hole 3220b. The threaded sub part 364 is engaged with the bottom small hole 3220b. The threaded end 368 is engaged with a nut 370. The nut 370 is positioned in the top big hole 3420b and is blocked by the top small hole 3420c.

The top turntable 340 further defines an annular groove 3402 on a surface facing the bottom turntable 320. A plurality of first contacts (not shown) is positioned in the annular groove 3402. The first contacts are electrically connected to the top sub conductor 3424 carried on the top sub PCB 3422 via wires (not shown). The bottom turntable 320 forms a protrusion 3200 received in the annular groove 3402. A second contact 3202 is positioned on a top surface of the protrusion 3200. The second contact 3202 is electrically connected to the bottom sub conductor 3224 carried on the bottom sub PCB 3222 via wires (not shown). When a user operates the bottom turntable 320 and make the bottom turntable 320 to rotate around the pivot shaft 36, the second contact 3202 slides and makes contact with a different one of the first contacts, thus to trigger different functions of the rotatable cell phone 100.

The signal transmitting unit 40 includes a light signal emitter 42 and a light signal receiver 44 positioned at two opposite ends of the axial through hole 360. The light signal emitter 42 is electrically connected to the bottom sub PCB 3222. Electrical signals emitted out by the bottom PCB 14 are transmitted to the light signal emitter 42 through the bottom conductor 140, the bottom sub conductor 3224, and the bottom sub PCB 3222 in turn. The light signal emitter 42 converts the electrical signals to the light signals and emits the light signals to the light signal receiver 44 electrically connected to the top sub PCB 3422. Then, the light signal receiver 44 converts the light signals to the electrical signals and transmits the electrical signals into the top PCB 24 via the top sub PCB 3422, the top sub conductor 3424, and the top conductor 240 in turn. In this way, the main unit 10 can transmit the electrical signals to the display unit 20 and control the display unit 20 to display text, picture, and video when needed.

The signal transmitting unit 40 further includes a plurality of optical collimators 46 positioned between the light signal emitter 42 and the light signal receiver 44. The optical collimators 46 gather light emitted from the light signal emitter 42 and transmit to the light signal receiver 44, thus to improve the light signal transmitting efficiency of the signal transmitting unit 40.

When needed, a user can easily disconnect the top clips 3426 and the top clip holders 222, thereby replace the display unit 20, or easily disconnect the bottom clips 3226 and the bottom clip holders 122, thereby replace the main unit 10.

Figure 5:
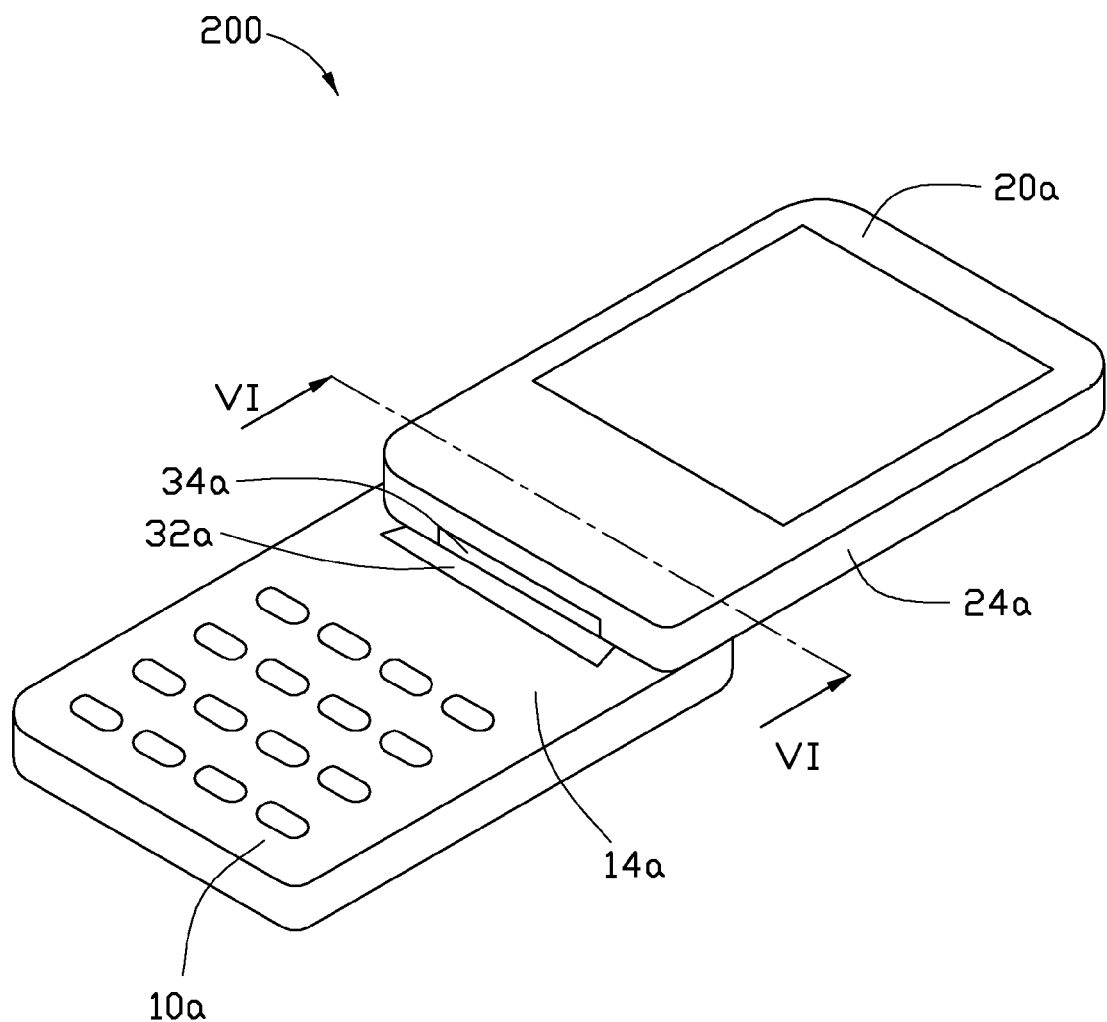
FIG. 5 is a schematic, isometric view of a rotatable cell phone according to a second embodiment.
Figure 6:
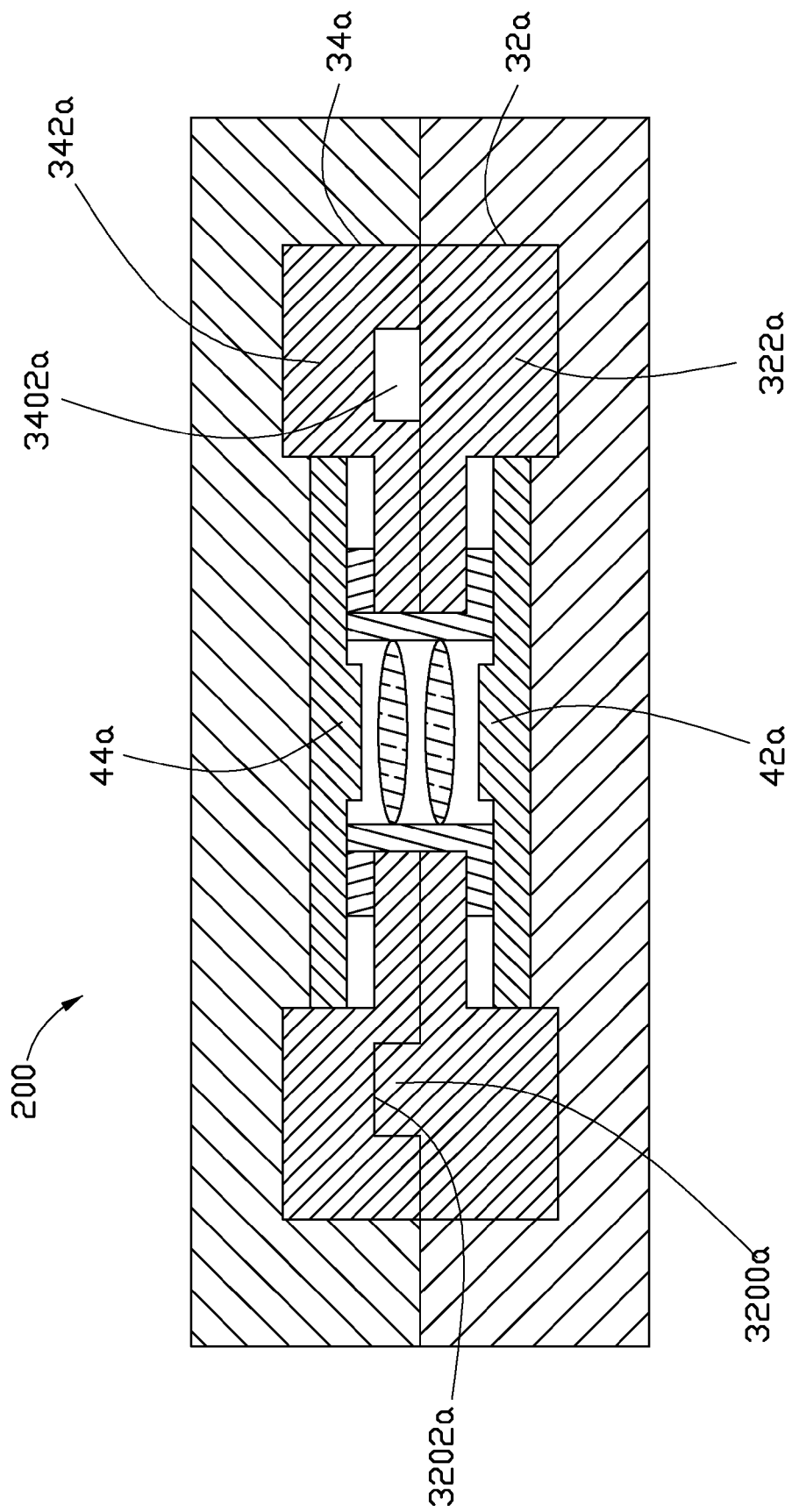
FIG. 6 is a cross-sectional view taken along line VI-VI of FIG. 5.

Referring to FIGS. 5 and 6, a rotatable cell phone 200 according to a second embodiment is disclosed. The rotatable cell phone 200 of the second embodiment is similar to the rotatable cell phone 100 of the first embodiment, but different in the structure of the top assembly module 34a and the bottom assembly module 32a. The top assembly module 34a only includes a top attachment piece 342a. The bottom assembly module 32a only includes a bottom attachment piece 322a. The top attachment piece 342a defines an annular groove 3402a with a plurality of first contacts received therein. The bottom attachment piece 322a includes a protrusion 3200a with a second contact 3202a positioned on a top surface thereof. The protrusion 3200a is received in the annular groove 342a. When the display unit 20 is driven to rotate around the pivot shaft (not shown), the display unit 20 drives the top attachment piece 342 to rotate, the second contact 3202a slides and contacts with different one of the first contacts, thus to trigger on different functions of the rotatable cell phone 200.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A rotatable cell phone comprising:
 a display unit comprising:
  a top housing defining a top recess thereon; and
  a top printed circuit board received in the top housing and defining a top conductor exposed in the top recess;
 a main unit movably connected to the display unit and comprising:
  a bottom housing defining a bottom recess thereon; and
  a bottom PCB received in the bottom housing and defining a bottom conductor exposed in the bottom recess;
 a connecting unit connected between the display unit and the main unit, the connecting unit comprising:
  a top assembly module detachably mounted in the top recess, the top assembly module comprising a top sub conductor electrically coupled with the top conductor;
  a bottom assembly module detachably mounted in the bottom recess, the bottom assembly module comprising a bottom sub conductor electrically coupled with the bottom conductor; and
  a pivot shaft rotatably connecting the top assembly module to the bottom assembly module, and defining an axial hole thereon; and
 a signal transmitting unit received in the axial hole of the pivot shaft, and configured for transmitting signals from the main unit to the display unit.

2. The rotatable cell phone of claim 1, wherein each of the top recess and the bottom recess defines a plurality of clip holders, and each of the top assembly module and the bottom assembly module comprises a plurality of clips engaged with the corresponding clip holders.

3. The rotatable cell phone of claim 2, wherein the clips are magnetic or mechanical.

4. The rotatable cell phone of claim 1, wherein the signal transmitting unit comprises a light signal emitter for converting electrical signals of the main unit to light signals and emitting the light signals to a light signal receiver, the light signal receiver converting the light signals to electrical signals and transmitting the electrical signals to the display unit.

5. The rotatable cell phone of claim 4, wherein the signal transmitting unit further comprises a plurality of optical collimator positioned between the light signal emitter and the light signal receiver.

6. The rotatable cell phone of claim 1, wherein the top assembly module comprises a top attachment piece and a top turntable rotatably connected to the top attachment piece by the pivot shaft, and the bottom assembly module comprises a bottom attachment piece and a bottom turntable rotatably connected to the bottom attachment piece by the pivot shaft.

7. The rotatable cell phone of claim 6, wherein the top turntable defines an annular groove facing the bottom turntable, and the bottom turntable comprises a protrusion received in the annular groove.

8. The rotatable cell phone of claim 7, wherein the top turntable comprises a plurality of first contacts positioned in the annular groove and electrically connected to the top sub conductor, the bottom turntable comprises a second contact positioned on the protrusion and electrically connected to the bottom sub conductor, when the bottom turntable rotates around the pivot shaft, the second contact slides and contacts with a different one of the first contacts, thus to trigger on different functions of the rotatable cell phone.

9. The rotatable cell phone of claim 6, wherein each of the top attachment piece and the bottom attachment piece defines a stepped hole, each of the top turntable and the bottom turntable defines a through hole, the pivot shaft extends through each of the stepped holes and each of the through holes, thus to rotatably connect the top attachment piece, the top turntable, the bottom attachment piece and the bottom turntable.

10. The rotatable cell phone of claim 9, further comprising a nut positioned in the stepped hole of the top attachment piece and screwed on one end of the pivot shaft.

11. The rotatable cell phone of claim 9, wherein the pivot shaft is screwed on the stepped hole of the bottom attachment piece.

12. The rotatable cell phone of claim 9, wherein the pivot shaft is a stepped shaft, the big part of the pivot shaft is positioned in the big part of the stepped hole of the bottom attachment piece and is blocked by the small part of the stepped hole of the bottom attachment piece.

13. The rotatable cell phone of claim 1, wherein the top assembly module comprises a top attachment piece, the bottom assembly module comprises a bottom attachment piece rotatably connected to the top attachment piece by the pivot shaft.

14. The rotatable cell phone of claim 13, wherein the top attachment piece defines an annular groove facing the bottom attachment piece, the bottom attachment piece comprises a protrusion received in the annular groove.

15. The rotatable cell phone of claim 14, wherein the top attachment piece comprises a plurality of first contacts positioned in the annular groove and electrically connected to the top sub conductor, the bottom attachment piece comprises a second contact positioned on the protrusion and electrically connected to the bottom sub conductor, when the bottom attachment piece rotates around the pivot shaft, the second contact slides and contacts with a different one of the first contacts, thus to trigger on different functions of the rotatable cell phone.

* * * * *